(12) United States Patent
Jennen et al.

(10) Patent No.: US 7,650,081 B2
(45) Date of Patent: Jan. 19, 2010

(54) METHOD AND APPARATUS FOR RECEIVING FREQUENCY MODULATED SIGNALS ON AN INTENSITY MODULATED OPTICAL CARRIER

(75) Inventors: Jean G. Jennen, Huizen (NL); Kyriakos Vlachos, Athens (GR)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 918 days.

(21) Appl. No.: 10/853,825

(22) Filed: May 26, 2004

(65) Prior Publication Data

US 2005/0265732 A1 Dec. 1, 2005

(51) Int. Cl.
*H04B 10/04* (2006.01)
*H04B 10/06* (2006.01)

(52) U.S. Cl. ............... 398/186; 398/187; 398/202

(58) Field of Classification Search ......... 398/183–188, 398/202, 84, 85, 79, 198, 82, 43, 200, 214
See application file for complete search history.

(56) References Cited

U.S. PATENT DOCUMENTS

| | | | | |
|---|---|---|---|---|
| 3,600,587 | A * | 8/1971 | Smith | 398/187 |
| 4,965,857 | A * | 10/1990 | Auracher et al. | 398/154 |
| 5,023,949 | A * | 6/1991 | Auracher et al. | 398/184 |
| 5,896,211 | A * | 4/1999 | Watanabe | 398/76 |
| 5,923,454 | A * | 7/1999 | Eastmond et al. | 398/202 |
| 6,583,400 | B2 * | 6/2003 | Miyoshi | 250/214 A |
| 6,714,702 | B2 * | 3/2004 | Whiteaway et al. | 385/24 |
| 7,200,344 | B1 * | 4/2007 | Hoshida | 398/202 |
| 2002/0071156 | A1 * | 6/2002 | Tervonen et al. | 359/127 |
| 2002/0149818 | A1 * | 10/2002 | Tomofuji et al. | 359/124 |
| 2004/0184819 | A1 * | 9/2004 | Vassilieva et al. | 398/188 |

OTHER PUBLICATIONS

K. Vlachos et al. "An Optical IM/FSK Coding Technique for the Implementation of a Label-Controlled Arrayed Waveguide Packet Router", Journal of lightwave technology, vol. 21, No. 11, Nov. 2003.*

Sulur et al., "IP Over DWDM Networks Supported by GMPLS-Based LOBS Deploying Combined Modulation Format" Opticomm 2001, Aug. 2001, Denver, Colorado.

Sulur et al., "Combined ASK/FSK and ASK/DPSK Modulation Formats for Optically Labeled Signals", Proc. ONDM'2002, Torino, Italy, Feb. 4-6, 2002.

T. Koonen et al., "Optical Packet Routing in IP-Over-WDM Networks Deploying Two-Level Optical Labeling", 27th Eur. Conf. Optical Communication 2001, vol. 4, 2001, pp. 608-609.

(Continued)

*Primary Examiner*—M. R. Sedighian
(74) *Attorney, Agent, or Firm*—Wall +Tong, LLP

(57) ABSTRACT

The present invention provides a method and an FSK/IM receiver to solve the problem of burst-mode detection of frequency modulated labels on an ASK (or IM) payload. In accordance with one embodiment of the present invention, two FSK tones of an input FSK/IM optical signal are separated and communicated to a balanced detector. At the balanced detector, the two FSK tones are subtracted from each other and result in an AC-coupled data stream. The AC-coupled data stream is communicated to a Schmitt-trigger where the hysteresis of the Schmitt-trigger finally eliminates any residual ASK (or IM) payload in the recovered output data. The present invention provides both single channel and WDM solutions.

26 Claims, 13 Drawing Sheets

OTHER PUBLICATIONS

T. Koonen et al., "An Optical-Label Controlled Packet Router For IP-Over-WDM Networks" LEOs Benelux symposium, Dec. 2001, Brussels, Belgium.

H. J. Lee, "A Simple All-Optical Label Detection and Swapping Technique Incorporating a Fiber Bragg Grating Filter", IEEE Photonics Technology Letters, vol. 13, No. 6, Jun. 2001, pp. 635-637.

K. Vlachos, "An Optical IM/FSK Coding Technique For the Implementation of a Label-Controlled Arrayed Waveguide Packet Router," Journal of Lightwave Technology, vol. 21, No. 11, Nov. 2003, pp. 2617-2628.

R. S. Vodhanel et al., "Performance of Directly Modulated DFB Lasers in 10-Gb/s ASK, FSK, and DPSK Lightwave Systems", J. of Lightwave Tech., vol. 8, No. 9, Sep. 1990, pp. 1379-1386.

* cited by examiner

US 7,650,081 B2

METHOD AND APPARATUS FOR RECEIVING FREQUENCY MODULATED SIGNALS ON AN INTENSITY MODULATED OPTICAL CARRIER

FIELD OF THE INVENTION

This invention relates to a data receiving system and, more specifically, to a method, apparatus and system for receiving frequency modulated labels on an intensity-modulated (IM) optical carrier.

BACKGROUND OF THE INVENTION

The amount of packet-based data traffic in today's telecommunication networks is increasing steeply, and in many networks has already overtaken circuit-switched traffic. In order to answer the exploding demand for network capacity, wavelength division multiplexing (WDM) is being introduced in core networks, in metropolitan area networks, and in access networks.

In most current systems, Internet Protocol (IP) packet-based data is typically carried over WDM, with synchronous digital hierarchy (SDH) or asynchronous transfer mode (ATM) as the intermediate layers. However, avoiding these intermediate layers by carrying IP directly over WDM yields more efficient and cost-effective networks, and is generally considered to be the preferred approach in data-centric networks. IP-over-WDM is supported by an optical multi-protocol label switching protocol (MPLS) formerly known as MPλS protocol, an optical multi-protocol wavelength switching protocol, and now part of Generalized Multi-Protocol Label Switching (GMPLS) particularly with reference to the Lambda-Switched Capable (LSC) level, where label-switched paths (LSP-s) are being associated with optical channels. Optical packets (or bursts of packets) are switched to other wavelengths (label swapping or switching) at transmitters in network edge nodes and (optionally) in the intermediate network core nodes. Wavelength routers in the core nodes guide the packets along the appropriate network paths.

In addition to optically labeling a packet (or bursts of packets) by assigning a particular wavelength to it, a next-level label can be attached by using a particular modulation scheme. The latter may be accomplished by modulating the label information orthogonally to the packet data (i.e., modulating the phase of the optical carrier (FSK or DPSK) while the packet data is modulated on the intensity of the optical carrier). Having two optical labels is in agreement with label stacking as foreseen in MPLS, and is in accordance with switching or routing part of the streams group-wise. Henceforth, frequency shift keying (FSK) is considered as the second optical label level. To interpret the contents of the FSK label at label-controlled nodes, the FSK label needs to be separated from the amplitude shift keyed (ASK), or intensity modulated (IM) in general, payload at the incoming port. Generally, the use of a frequency discriminator, such as a narrow band optical filter, offers this capability and functions optimally for continuous bit-rate signals. However, in packet-switched networks, the receivers must function with burst-mode traffic. In such systems, correct data recovery of the optical FSK label will be hampered by residual ASK (or IM) modulation from the payload. Depending on the ratio between the ASK (or IM) and FSK bit-rates and the payload contents, the impact of this residual ASK (or IM) effect can vary from negligible to severe.

Demodulation of the FSK label by frequency discrimination acts as a moving average over the payload signal multiplied by the FSK label information ("0" or "1"). Variation of the payload contents over time will appear on the received "1" level of the FSK label. In the case of long run-lengths in the payload and/or small bit-rate ratios between the ASK (or IM) and FSK data streams, dynamic determination of the right threshold level for label data recovery is extremely difficult.

SUMMARY OF THE INVENTION

The present invention solves the deficiencies of the prior art by providing a method and apparatus for detection of frequency modulated labels on intensity modulated optical carriers.

In one embodiment of the present invention, a method for detecting a frequency modulated signal on an intensity modulated optical carrier includes separating the frequency tones of a frequency modulated signal of an intensity modulated optical carrier, converting each of the separated frequency tones into a representative current, subtracting the currents to determine a resultant current, converting the resultant current into a differential voltage, and performing a logic operation on the resultant voltage using two predetermined voltage thresholds, wherein the voltage thresholds include a high threshold to switch during low-to-high transitions of the frequency modulated signal and a lower threshold to switch during high-to-low transitions of the frequency modulated signal.

In an alternate embodiment of the present invention, a receiver for receiving a frequency modulated signal on an intensity modulated optical carrier includes a means for separating frequency tones of a frequency modulated signal of a received intensity modulated optical carrier, a balanced detector including individual detectors for separately detecting each of the separated frequency tones, an amplifier, for converting a current output of the balanced detector into a differential voltage output, and a logic circuit having two voltage thresholds, the logic circuit adapted for receiving the voltage output of the amplifier and providing an output indicative of the frequency modulated signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a method and apparatus for the reception of frequency modulated labels on an intensity modulated optical carrier. Although various embodiments of the present invention are being depicted herein for receiving a frequency shift keyed (FSK) signal having two tones, the specific embodiments of the present invention should not be treated as limiting the scope of the invention. It will be appreciated by one skilled in the art informed by the teachings of the present invention that the concepts of the present invention may be applied for receiving other modulated optical signals, such as subcarrier modulated (SCM) signals. However, it should be noted that for frequency modulated signals having tones that carry both high and low levels, such as SCM signals, the output of one of the detection devices of an included balanced detector for detecting the two tones must be inverted before subtracting the outputs (i.e., the outputs are added instead of subtracted.)

Figure 1:
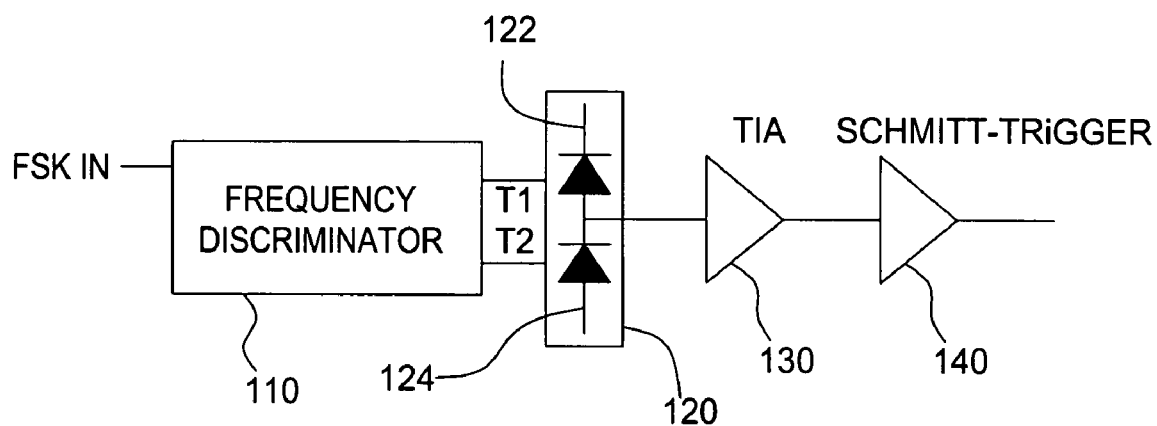
FIG. 1 depicts a high level block diagram of an embodiment of an FSK/IM receiver in accordance with the present invention.

FIG. 1 depicts a high level block diagram of an embodiment of an FSK/IM receiver in accordance with the present invention. The FSK/IM receiver 100 of FIG. 1 illustratively comprises a frequency discriminator 110, a balanced detector 120, an amplifier (illustratively a TransImpedance Amplifier (TIA)) 130, and a logic circuit having two voltage thresholds; a high threshold to switch the circuit during low-to-high transitions and a lower threshold to switch the circuit during high-to-low transitions (illustratively a Schmitt-trigger) 140. The balanced detector 120 of the FSK/IM receiver 100 of FIG. 1 illustratively comprises two electro-optic detectors (illustratively photodiodes) 122 and 124. The frequency discriminator 110 of the FSK/IM receiver 100 of FIG. 1 illustratively comprises a single input, $FSK_{in}$, and two outputs, T1 and T2. Although in FIG. 1 the logic circuit is depicted as a Schmitt trigger 140, other logic circuits having substantially similar operation as the Schmitt trigger may be implemented in place of the Schmitt trigger 140 in accordance with the present invention. In addition, although in FIG. 1 the electro-optic detectors 122 and 124 are depicted as photodiodes, other electro-optic detectors may be implemented in place of the photodiodes 122 and 124 of the present invention. Finally, although in FIG. 1 the amplifier 130 is depicted as a TIA, in alternate embodiments of the present invention, other amplifiers capable of converting the current output of the photodiodes 122, 124 of the balanced detector 120 into a differential voltage output may be implemented in place of the TIA 130 in accordance with the present invention.

In the FSK/IM receiver 100 of FIG. 1, an intensity modulated (IM) optical carrier having FSK data is communicated to the input, $FSK_{in}$, of the frequency discriminator 110. In the intensity modulated (IM) optical carrier presented for description of the present invention, the FSK scheme used comprises two tones. Typically in two-tone FSK schemes, one of the tones corresponds with a logical high of the FSK signal and the other with a logical low. The frequency discriminator 110 of the FSK/IM receiver 100 of FIG. 1 separates the two FSK tones of the input IM optical signal such that the tone of the FSK signal corresponding to a logical high (e.g., a logic one) is communicated to one output of the frequency discriminator 110 (illustratively output T1) and the tone of the FSK signal corresponding to a logical low (e.g., a logic zero) is communicated to the other output of the frequency discriminator 110 (illustratively output T2).

Figure 2:
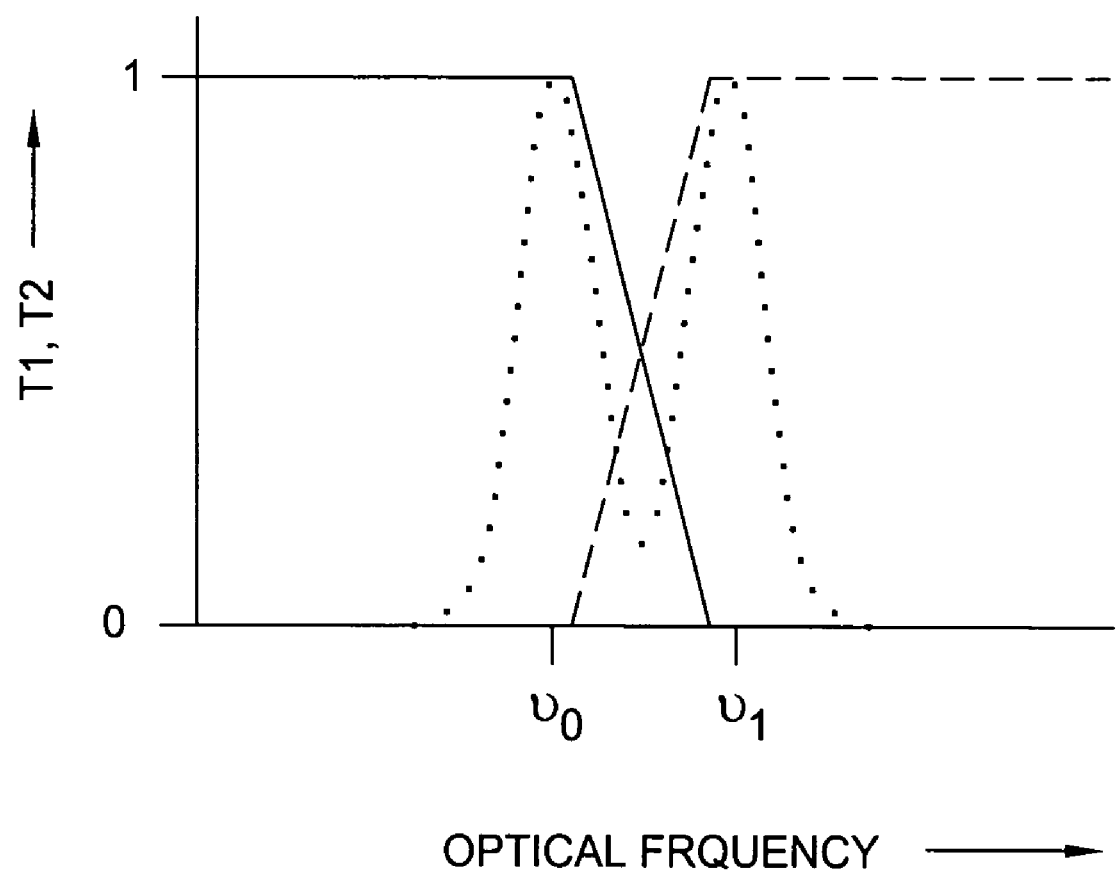
FIG. 2 graphically depicts the transfer function of the frequency discriminator of the FSK/IM receiver of FIG. 1.

FIG. 2 graphically depicts the transfer function of the frequency discriminator 110 of the FSK/IM receiver 100 of FIG. 1. In FIG. 2, the optical frequency of the FSK/IM signal is plotted versus the outputs of the T1 and T2 outputs of the frequency discriminator 110. The transmission function of T1 output is plotted as a solid curve and the T2 output is plotted as a dashed curve. The FSK/IM frequency spectrum is plotted as a dotted curve. FIG. 2 depicts that when the transmission function of T1 and T2 are appropriately selected, one tone of the FSK signal is centered at $v_o$ (i.e., depicted by the solid transmission function) and the other one is centered at $v_1$ (i.e., depicted by the dashed transmission function). As such, the tones are separated.

Referring back to FIG. 1, the signal from the first output port T1 of the frequency discriminator 110 is communicated to the first photodiode 122 of the balanced detector 120 and the signal from the second output port T2 is communicated to the second photodiode 124 of the balanced detector 120. The signals from the first photodiode 122 and the second photodiode 124 are subtracted and result in an AC-coupled data stream. More specifically, due to the balanced detection of the present invention, one detector senses the "high" level and the other the "low" level and thus, a DC-free signal is received at the output, resulting in an average reception power independent receiver.

Figure 3:
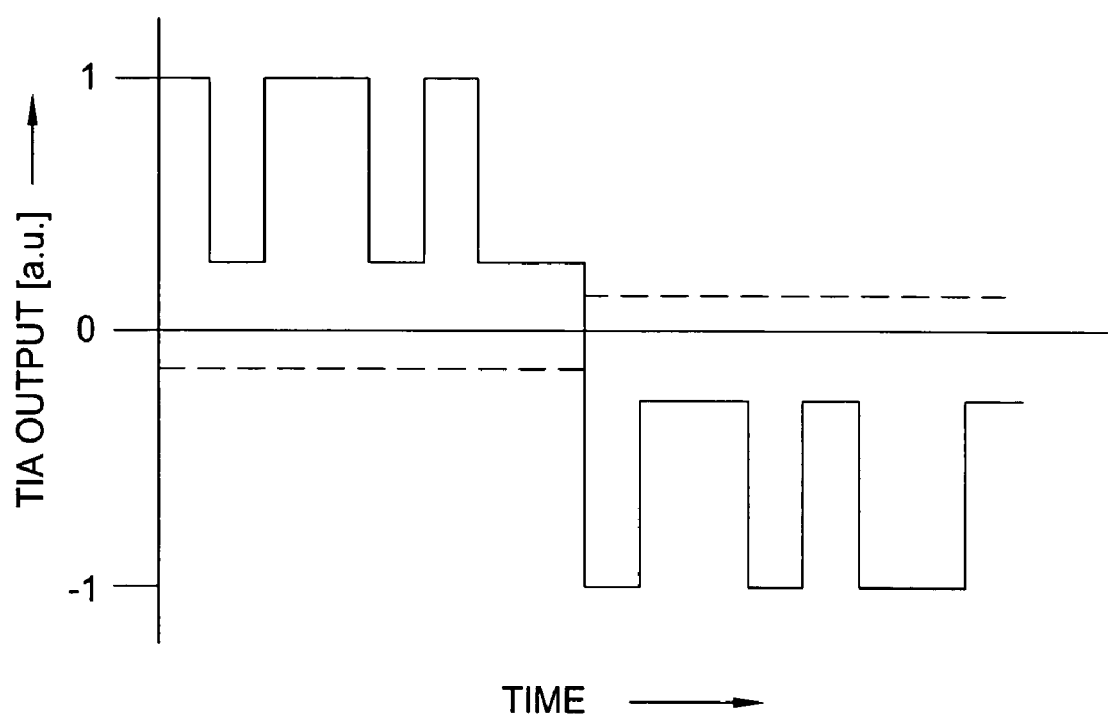
FIG. 3 graphically depicts the output of the TIA of the FSK/IM receiver of FIG. 1.

The AC-coupled data stream from the balanced detector 120 is communicated to the TIA 130. The TIA 130 converts the current output of the photodiodes 122, 124 of the balanced detector 120 into a differential voltage output. FIG. 3 graphically depicts the output of the TIA 130. In FIG. 3, the output of the TIA 130 is plotted as a function of time. In FIG. 3, the residual intensity modulation of the output of the TIA 130 is clearly visible. For the embodiment of the FSK/IM receiver 100 of FIG. 1, an ASK payload with a bit-rate eight times larger than the FSK label rate was selected. Also depicted in FIG. 3 is the hysteresis threshold (plotted as a dotted line) of the Schmitt-trigger 140 for reference purposes.

Referring back to FIG. 1, the output of the TIA 130 is communicated to the Schmitt-trigger 140. The Schmitt-trigger 140 comprises a high state and a low state. In the operation, when the input voltage from the TIA 130 reaches a first high threshold level, the output of the Schmitt-trigger 140 immediately changes to its high state. Reducing the input voltage does not cause the output of the Schmitt-trigger 140 to change to its low state. The Schmitt-trigger output is only changed to its low state when the input voltage drops below a low threshold level. The input level at which the output of the Schmitt-trigger increases to a maximum, and the level at which it drops to a minimum (e.g., zero) are typically different levels. This is referred to as HYSTERESIS. Such a trigger scheme is immune to noise as long as the peak-to-peak amplitude of the noise is less than the difference between the threshold voltages.

Figure 4:
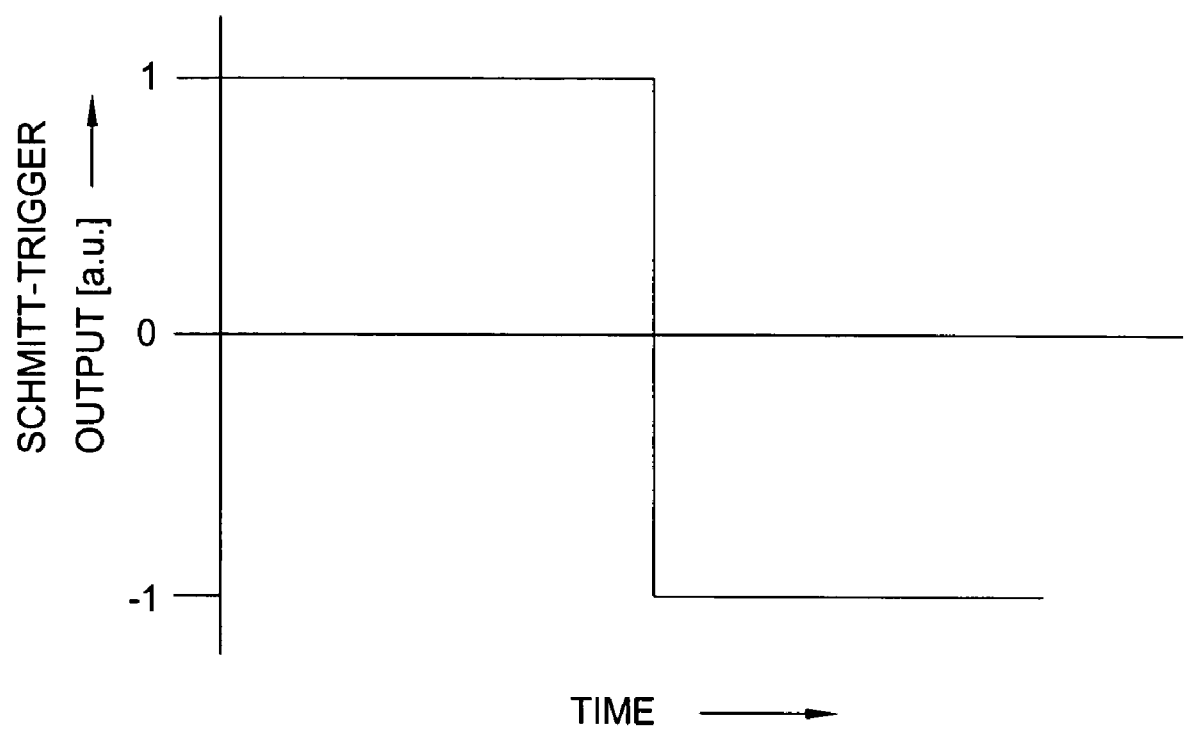
FIG. 4 graphically depicts the operation and output of the Schmitt-trigger of the FSK/IM receiver of FIG. 1.

FIG. 4 graphically depicts the operation and output of the Schmitt-trigger 140. In FIG. 4, the output of the Schmitt trigger 140 is plotted as a function of time. Due to its hysteresis, the Schmitt-trigger 140 is capable of eliminating the residual IM present in the output of the TIA 130 and provides a clean digital signal for further processing. For example and referring to FIG. 3 and FIG. 4, the output of the Schmitt-trigger 140 does not change states until the output of the TIA 130 crosses a predetermined threshold level of the Schmitt-trigger 140. In the present invention, payload pattern independent operation is assured as long as the lowest received intensity at any photodiode stays above the absolute value of the hysteresis threshold. To support infinite extinction ratios (i.e. the logical "0" level equals zero), a clear "1" level of the IM signal should appear within ⅛ of the FSK bit time after a transition between "1" and "0" levels of the FSK signal has occurred.

Although the FSK/IM receiver 100 of FIG. 1 is depicted as comprising a frequency discriminator 110 for separating the two FSK tones of an input IM optical signal, substantially any component or combination of components capable of separating the two FSK tones of an input IM optical signal may be implemented in an FSK/IM receiver of the present invention.

Figure 5:
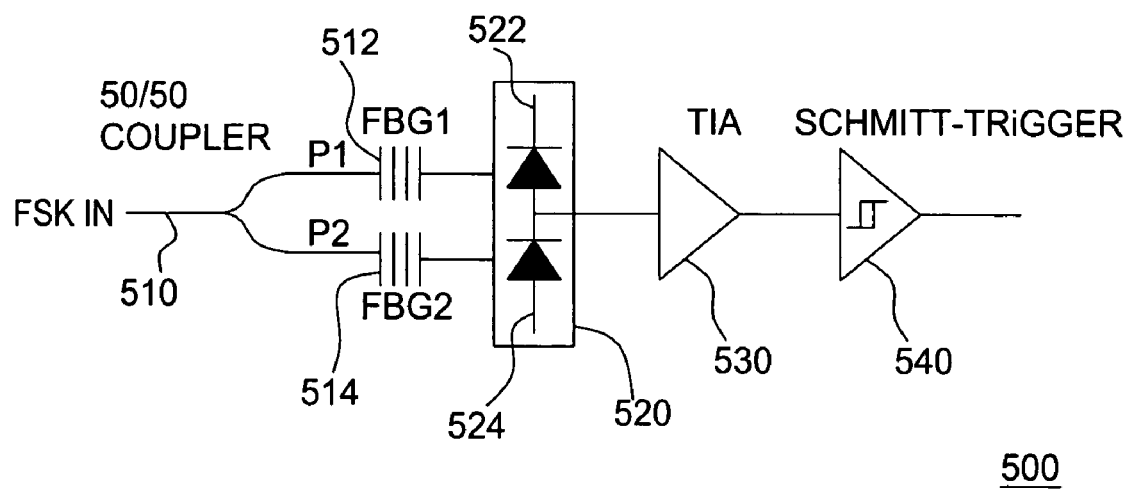
FIG. 5 depicts a high level block diagram of an alternate embodiment of an FSK/IM receiver in accordance with the present invention.

For example, FIG. 5 depicts a high level block diagram of an alternate embodiment of an FSK/IM receiver in accordance with the present invention. In the FSK/IM receiver 500 of FIG. 5, the frequency discriminator 110 of the FSK/IM receiver 100 of FIG. 1 is replaced with a 50/50 coupler and two fiber Bragg gratings. More specifically, the FSK/IM receiver 500 of FIG. 5 comprises a 50/50 coupler 510, two fiber Bragg gratings 512 and 514, a balanced detector 520, an amplifier (illustratively a TransImpedance Amplifier (TIA)) 530, and a Schmitt-trigger 540. The balanced detector 520 of the FSK/IM receiver 500 of FIG. 5 illustratively comprises two photodiodes 522 and 524. The 50/50 coupler 510 of the FSK/IM receiver 500 of FIG. 5 illustratively comprises a single input, $FSK_{in}$, and two outputs defining two separate optical paths P1 and P2.

The operation of the FSK/IM receiver 500 of FIG. 5 is substantially the same as described above for the FSK/IM receiver 100 of FIG. 1. Specifically, in the FSK/IM receiver 500 of FIG. 5, an intensity modulated (IM) optical carrier having FSK data is communicated to the input, $FSK_{in}$, of the 50/50 coupler 510. The 50/50 coupler 510 splits the incoming signal into the two optical paths P1 and P2. The portion of the optical signal in the first path P1 is communicated to the first fiber Bragg grating 512. The first fiber Bragg grating 512 is configured to eliminate the frequency tone of the FSK signal corresponding to a logical low (e.g., a logic zero) in the first path P1. The portion of the optical signal in the second path P2 is communicated to the second fiber Bragg grating 514. The second fiber Bragg grating 514 is configured to eliminate the frequency tone of the FSK signal corresponding to a logical high (e.g., a logic one) in the second path P2.

Figure 6:
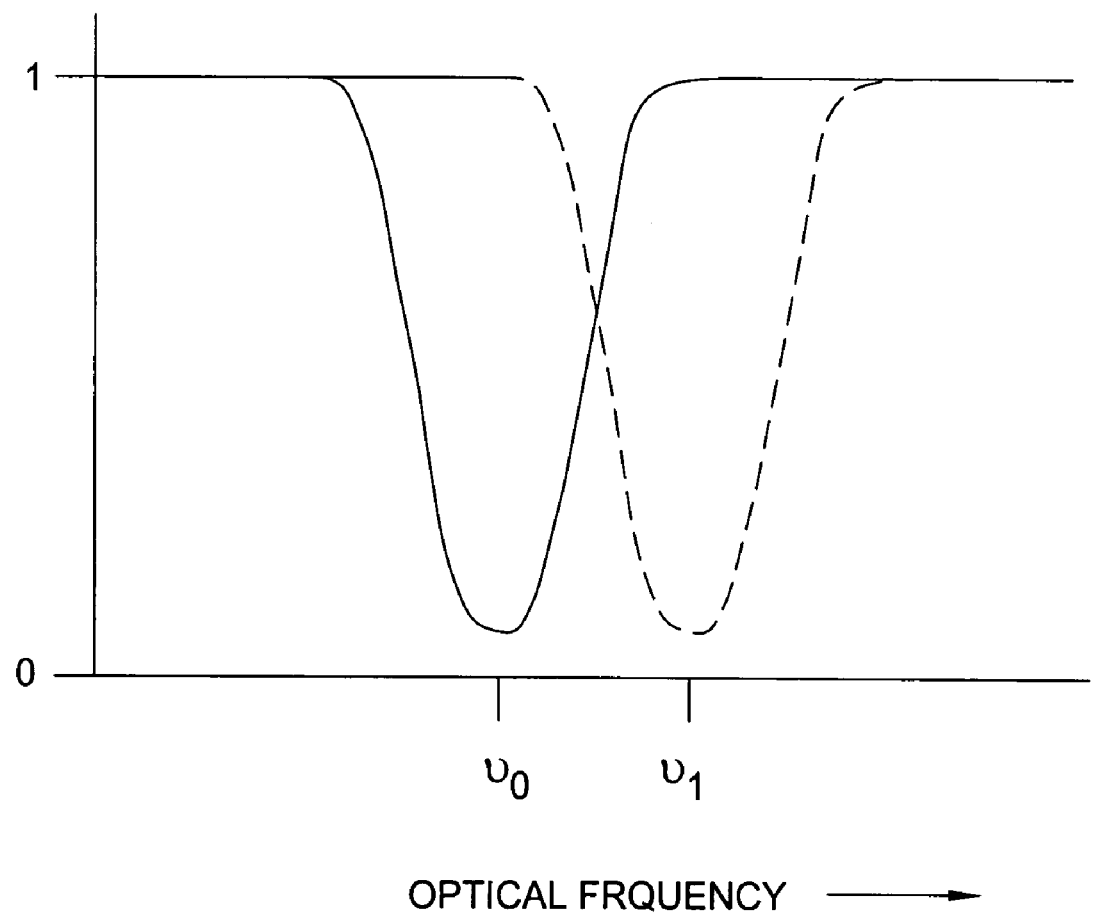
FIG. 6 graphically depicts the transfer function of the first fiber Bragg grating and the second fiber Bragg grating of the FSK/IM receiver of FIG. 5.

FIG. 6 graphically depicts the transfer function of the first fiber Bragg grating 512 and the second fiber Bragg grating 514. In FIG. 6, the optical frequency of the FSK/IM signal is plotted versus the outputs of the first fiber Bragg grating 512 and the second fiber Bragg grating 514. The transmission function of the first fiber Bragg grating 512 is plotted as a solid curve and the transmission function of the second fiber Bragg grating 514 is plotted as a dashed curve. As depicted in FIG. 6, the two functions are centered at $v_o$ and $v_1$ respectively.

Referring back to FIG. 5, the signal from the first fiber Bragg grating 512 is communicated to the first photodiode 522 of the balanced detector 520 and the signal from the second fiber Bragg grating 514 is communicated to the second photodiode 524 of the balanced detector 520. The signals from the first photodiode 522 and the second photodiode 524 are subtracted and result in an AC-coupled data stream as described above. The function of the remaining components of the FSK/IM receiver 500 of FIG. 5 is substantially the same as described above for the FSK/IM receiver 100 of FIG. 1. More specifically, the AC-coupled data stream from the balanced detector 520 is communicated to the TIA 530. The TIA 530 converts the current output of the photodiodes 522, 524 of the balanced detector 520 into a differential voltage output. The output of the TIA 530 is communicated to the Schmitt-trigger 540. As described previously, in the operation of the Schmitt-trigger 540, when the input voltage from the TIA 530 reaches a first high threshold level, the output of the Schmitt-trigger 540 immediately changes to its high state. Reducing the input voltage does not cause the output of the Schmitt-trigger 540 to change to its low state. The Schmitt-trigger output is only changed to its low state when the input voltage drops below a low threshold level. Due to its hysteresis, the Schmitt-trigger 540 is capable of eliminating any residual IM present in the output of the TIA 530 and provides a clean digital signal for further processing.

Figure 7:
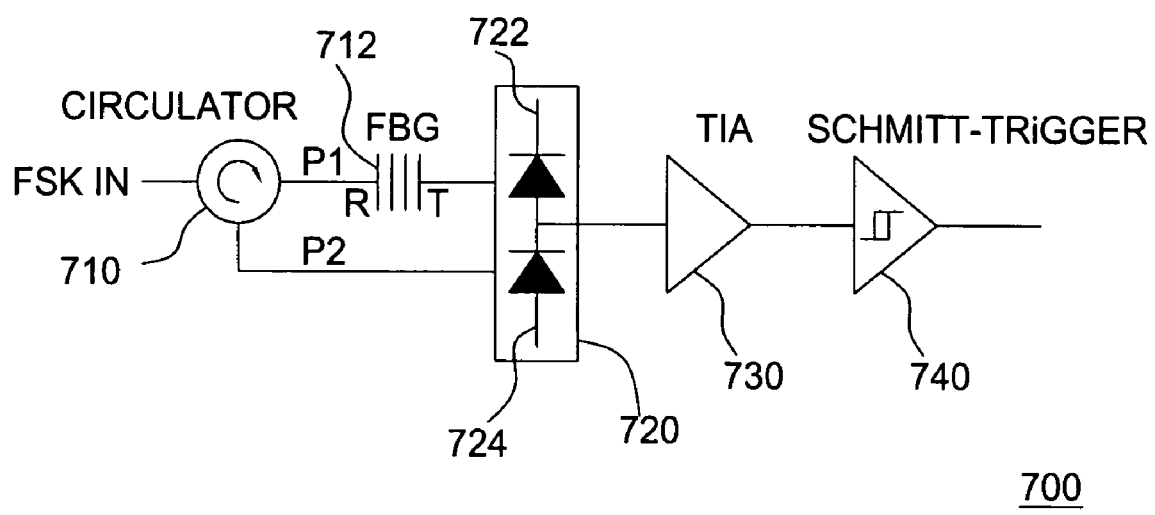
FIG. 7 depicts a high level block diagram of a third embodiment of an FSK/IM receiver in accordance with the present invention.

FIG. 7 depicts a high level block diagram of yet an alternate embodiment of an FSK/IM receiver in accordance with the present invention. In the FSK/IM receiver 700 of FIG. 7, the frequency discriminator 110 of the FSK/IM receiver 100 of FIG. 1 is replaced with a circulator and a fiber Bragg grating. More specifically, the FSK/IM receiver 700 of FIG. 7 comprises a circulator 710, a fiber Bragg grating 712, a balanced detector 720, an amplifier (illustratively a TransImpedance Amplifier (TIA)) 730, and a Schmitt-trigger 740. The balanced detector 720 of the FSK/IM receiver 700 of FIG. 7 illustratively comprises two photodiodes 722 and 724. The circulator 710 of the FSK/IM receiver 700 of FIG. 7 illustratively comprises a single input, $FSK_{in}$, and two outputs defining two separate optical paths P1 and P2.

The operation of the FSK/IM receiver 700 of FIG. 7 is substantially the same as described above for the FSK/IM receiver 100 of FIG. 1. Specifically, in the FSK/IM receiver 700 of FIG. 7, an intensity modulated (IM) optical carrier having FSK data is communicated to the input, $FSK_{in}$, of the circulator 710. The circulator directs the incoming signal into the first optical path P1 where the signal is communicated to the fiber Bragg grating 712. The fiber Bragg grating 712 is configured to transmit the frequency tone of the FSK signal corresponding to a logical high (e.g., a logic one) and to reflect the frequency tone of the FSK signal corresponding to a logical low (e.g., a logic zero). The reflected portion of the optical signal is directed by the circulator 710 to the second optical path P2. The signal from the fiber Bragg grating 712 is communicated to the first photodiode 722 of the balanced detector 720 and the signal in the second optical path P2 is communicated to the second photodiode 724 of the balanced detector 770. The signals from the first photodiode 722 and the second photodiode 724 are subtracted and result in an AC-coupled data stream as described above. The function of the remaining components of the FSK/IM receiver 700 of FIG. 7 is substantially the same as described above for the FSK/IM receiver 100 of FIG. 1. More specifically, the AC-coupled data stream from the balanced detector 720 is communicated to the TIA 730. The TIA 730 converts the current output of the photodiodes 722, 724 of the balanced detector 720 into a differential voltage output. Due to its hysteresis, the Schmitt-trigger 740 is capable of eliminating any residual IM present in the output of the TIA 730 and provides a clean digital signal for further processing.

Figure 8:
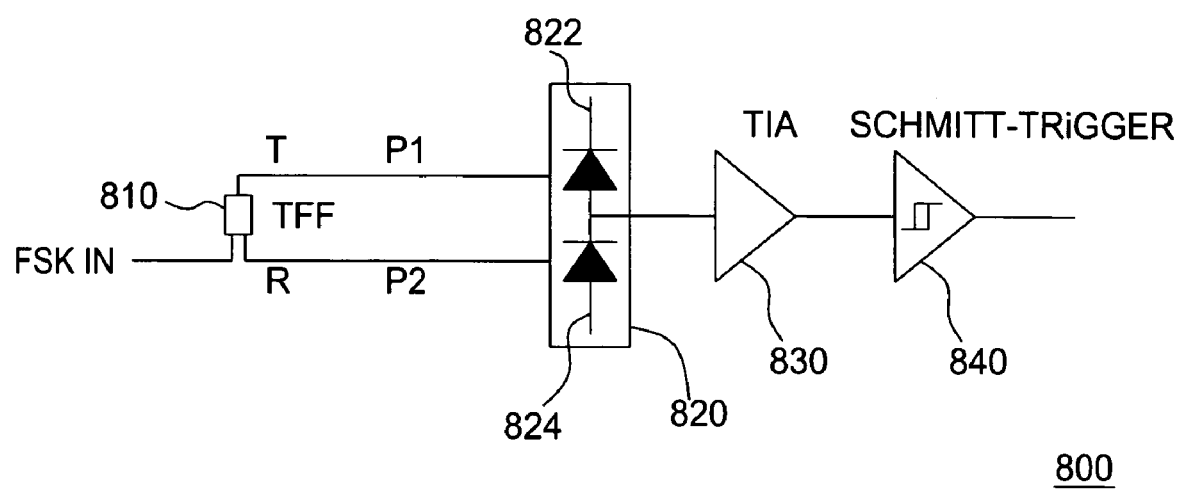
FIG. 8 depicts a high level block diagram of a fourth embodiment of an FSK/IM receiver having substantially similar transfer functions as the FSK/IM receiver of FIG. 7.

FIG. 8 depicts a high level block diagram of an alternate embodiment of an FSK/IM receiver having substantially similar transfer functions as the FSK/IM receiver 700 of FIG. 7. In the FSK/IM receiver 800 of FIG. 8, the frequency discriminator 110 of the FSK/IM receiver 100 of FIG. 1 is replaced with a thin film filter. More specifically, the FSK/IM receiver 800 of FIG. 8 comprises a thin film filter 810, a balanced detector 820, an amplifier (illustratively a TransImpedance Amplifier (TIA)) 830, and a Schmitt-trigger 840. The balanced detector 820 of the FSK/IM receiver 800 of FIG. 8 illustratively comprises two photodiodes 822 and 824. The thin film filter 810 of the FSK/IM receiver 800 of FIG. 8 illustratively comprises a single input, $FSK_{in}$, and two outputs defining two separate optical paths P1 and P2.

The operation of the FSK/IM receiver 800 of FIG. 8 is substantially the same as described above for the FSK/IM receiver 100 of FIG. 1. Specifically, in the FSK/IM receiver 800 of FIG. 8, an intensity modulated (IM) optical carrier having FSK data is communicated to the input, $FSK_{in}$, of the thin film filter 810. The thin film filter 810 is configured to transmit the frequency tone of the FSK signal corresponding to a logical high (e.g., a logic one) and to reflect the frequency tone of the FSK signal corresponding to a logical low (e.g., a logic zero). The transmitted portion of the optical signal is directed to the first optical path P2 and the reflected portion of the optical signal is directed to the second optical path P2. The signal in the first path P1 is communicated to the first photodiode 822 of the balanced detector 820 and the signal in the second optical path P2 is communicated to the second photodiode 824 of the balanced detector 870.

The signals from the first photodiode 822 and the second photodiode 824 are subtracted and result in an AC-coupled data stream as described above. The function of the remaining components of the FSK/IM receiver 800 of FIG. 8 is substantially the same as described above for the FSK/IM receiver 100 of FIG. 1. More specifically, the AC-coupled data stream from the balanced detector 820 is communicated to the TIA 830. The TIA 830 converts the current output of the photodiodes 822, 824 of the balanced detector 820 into a differential voltage output. Due to its hysteresis, the Schmitt-trigger 840 is capable of eliminating any residual IM present in the output of the TIA 830 and provides a clean digital signal for further processing.

Figure 9:
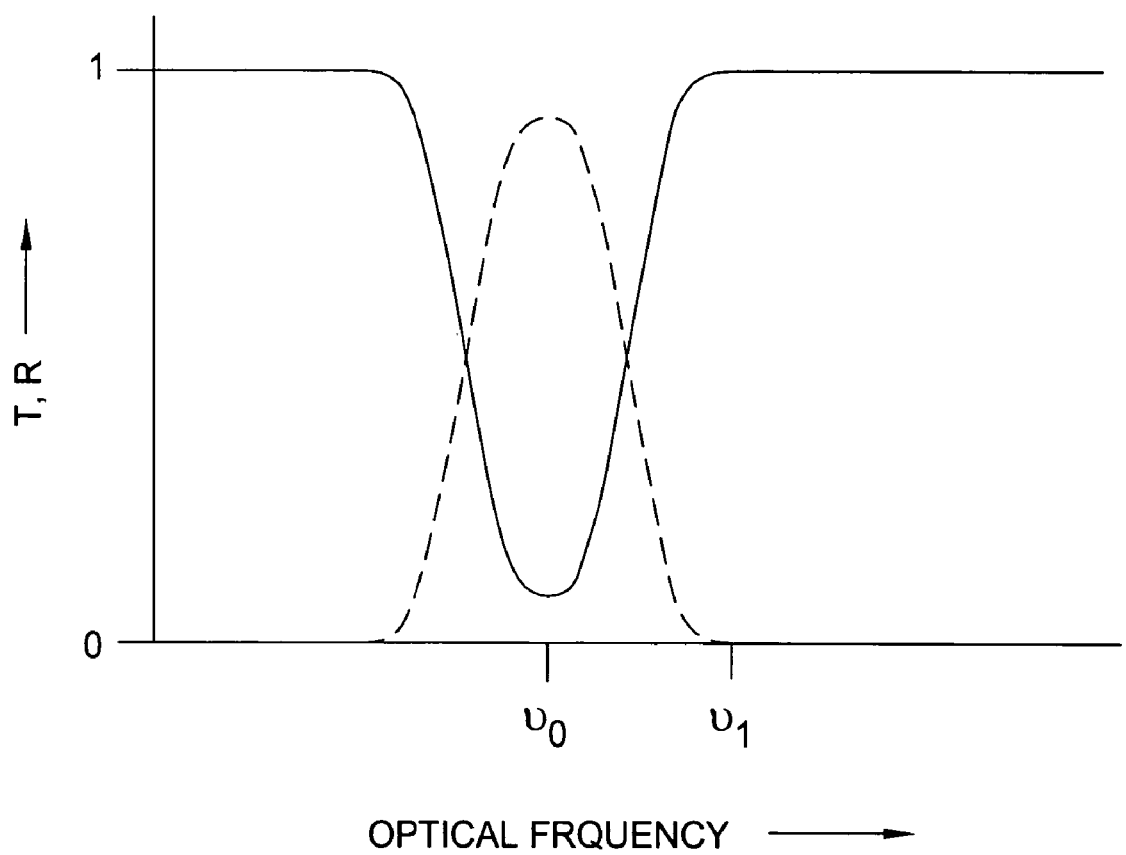
FIG. 9 graphically depicts the transfer function of the fiber Bragg grating of the FSK/IM receiver of FIG. 7 and the thin film filter of the FSK/IM receiver of FIG. 8.

FIG. 9 graphically depicts the transfer function of the fiber Bragg grating 712 of the FSK/IM receiver 700 of FIG. 7 and the thin film filter 810 of the FSK/IM receiver 800 of FIG. 8. In FIG. 9, the power of the FSK/IM signal is plotted as a function of the optical frequency of the FSK/IM signal for the transmitted and reflected portions of the optical signal from the Bragg grating 712 or the thin film filter 810. The transmitted portion of the optical signal is plotted as a solid curve and reflected portion of the optical signal is plotted as a dashed curve. As evidenced by FIG. 9, in both the fiber Bragg grating 712 of FIG. 7 and the thin film filter 810 of FIG. 8 the transmission function and the reflection function are complementary. As such, the transmission (dashed line) is centered at one optical tone (i.e., at $v_o$ as depicted in FIG. 9) and the remaining power is reflected back and via path P2.

Figure 10:
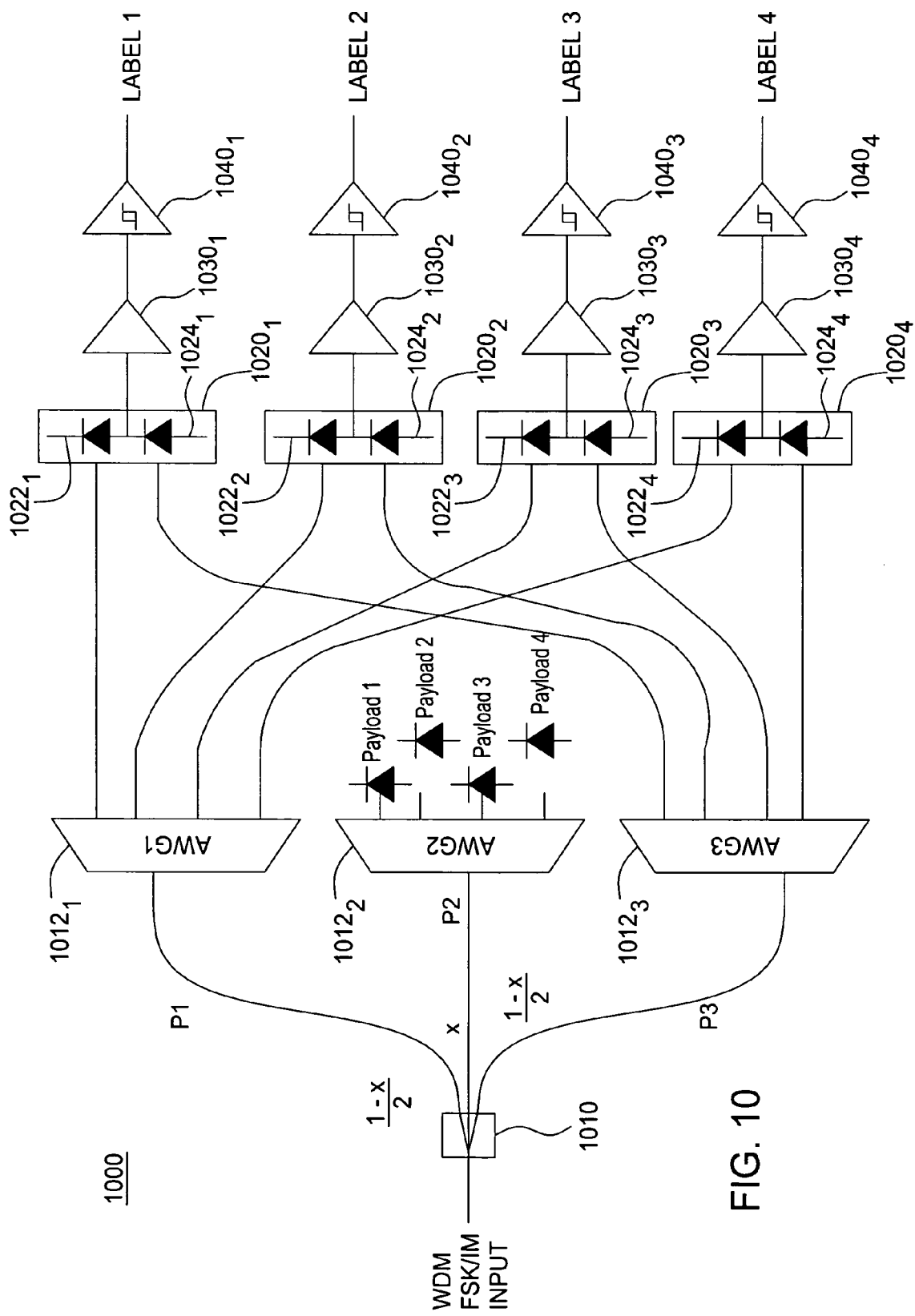
FIG. 10 depicts a high level block diagram of an embodiment of a WDM FSK/IM receiver in accordance with the present invention.

FIG. 10 depicts a high level block diagram of an embodiment of a WDM FSK/IM receiver in accordance with the present invention. The WDM FSK/IM receiver 1000 of FIG. 10 illustratively comprises an optical splitter 1010, three arrayed waveguide gratings (AWGs) $1012_1$-$1012_3$ (collectively AWGs 1012), four balanced detectors $1020_1$-$1020_4$ (collectively balanced detectors 1020), four amplifiers (illustratively TransImpedance Amplifiers (TIA)) $1030_1$-$1030_4$ (collectively TIAs 1030), and four Schmitt-triggers $1040_1$-$1040_4$ (collectively Schmitt-triggers 1040). The balanced detectors 1020 of the FSK/IM receiver 1000 of FIG. 10 each comprise two respective photodiodes $1022_1$-$1022_4$ and $1024_1$-$1024_4$. Each of the AWGs 1012 of the WDM FSK/IM receiver 1000 of FIG. 10 illustratively separates an incoming signal into four components (channels). Illustratively, in FIG. 10, the first channel of the first AWG $1012_1$ and the third AWG $1012_3$ are communicated to the first balanced detector $1020_1$, the second channel of the first AWG $1012_1$ and the third AWG $1012_3$ are communicated to the second balanced detector $1020_2$, the third channel of the first AWG $1012_1$ and the third AWG $1012_3$ are communicated to the third balanced detector $1020_3$, and the fourth channel of the first AWG $1012_1$ and the third AWG $1012_3$ are communicated to the fourth balanced detector $1020_4$.

In the FSK/IM receiver 1000 of FIG. 10, the incoming WDM FSK/IM signal is split by the optical splitter 1010 into three paths P1, P2 and P3 containing a fraction of the input power, respectively (1-x)/2, x, and (1-x)/2. The upper P1 and lower P3 paths are used to extract the tones corresponding to respectively a logical '1' or a logical '0 of each individual channel by means of the first AWG $1012_1$ and the third AWG $1012_3$. The IM information of each channel is obtained using the second AWG $1012_2$ by keeping both tones of each FSK label together. The demultiplexed payloads may then be either electrically terminated or applied to other components for further optical processing.

The operation of the FSK/IM receiver 1000 of FIG. 10 is substantially the same as described above for the FSK/IM receiver 100 of FIG. 1. Specifically, in the FSK/IM receiver 1000 of FIG. 10, an intensity modulated (IM) optical carrier having FSK data is communicated to the input, $FSK_{in}$, of the optical splitter 1010. The optical splitter 1010 splits the incoming signal into the three optical paths P1, P2 and P3. The portion of the optical signal in the first path P1 is communicated to the first AWG $1012_1$. The first AWG $1012_1$ is configured to separate the received optical signal into its illustratively four components (channels) and to eliminate the frequency tone of the received FSK signal corresponding to a logical low (e.g., a logic zero) for each of the four components separated by the first AWG $1012_1$. The respective separated components, now no longer comprising the frequency tone of the received FSK signal corresponding to a logical low, are each communicated to a respective first photodiode 1022 of a respective balanced detector 1020.

The portion of the optical signal in the second path P2 is communicated to the second AWG $1012_2$. The second AWG $1012_2$ is configured to separate the received optical signal into its illustratively four components (channels). As described above, the IM information of each channel is obtained using the second AWG $1012_2$ by keeping both tones of each FSK label together.

The portion of the optical signal in the third path P3 is communicated to the third AWG $1012_3$. The third AWG $1012_3$ is configured to separate the received optical signal into its illustratively four components (channels) and to eliminate the frequency tone of the received FSK signal corresponding to a logical high (e.g., a logic one) for each of the four components separated by the AWG $1012_3$. The respective separated components, now no longer comprising the frequency tone of the received FSK signal corresponding to a logical high, are each communicated to a respective second photodiode 1024 of a respective balanced detector 1020.

In each of the balanced detectors 1020 the signals from the first photodiode 1022 and the second photodiode 1024 are subtracted and result in an AC-coupled data stream as described above. The AC-coupled data stream from each of the balanced detectors 1020 is communicated to a respective TIA 1030. Each of the respective TIAs 1030 converts the current output of the photodiodes 1022, 1024 of the respective balanced detectors 1020 into a differential voltage output. As described above, due to its hysteresis, the respective Schmitt-triggers 1040 are capable of eliminating any residual IM present in the output of the respective TIAs 1030 and provide a clean digital signal for further processing. In the WDM FSK/IM receiver 1000 of FIG. 10, the FSK signal of the first component (channel) of the input WDM FSK/IM signal is output from the first Schmitt-trigger $1040_1$ and indicated as Label 1. The outputs of the remaining three Schmitt-triggers $1040_2$-$1040_4$ are labeled respectively, Label 2, Label 3 and Label 4. Although in FIG. 10, the FSK/IM receiver 1000 is depicted as comprising an AWG, the second AWG $1012_2$, for obtaining the IM information of each channel, in alternate embodiments of the present invention, the second AWG $1012_2$ is not included in a WDM FSK/IM receiver in accordance with the present invention as it is not always necessary to obtain the IM information of each channel of a received WDM FSK/IM signal.

Figure 11:
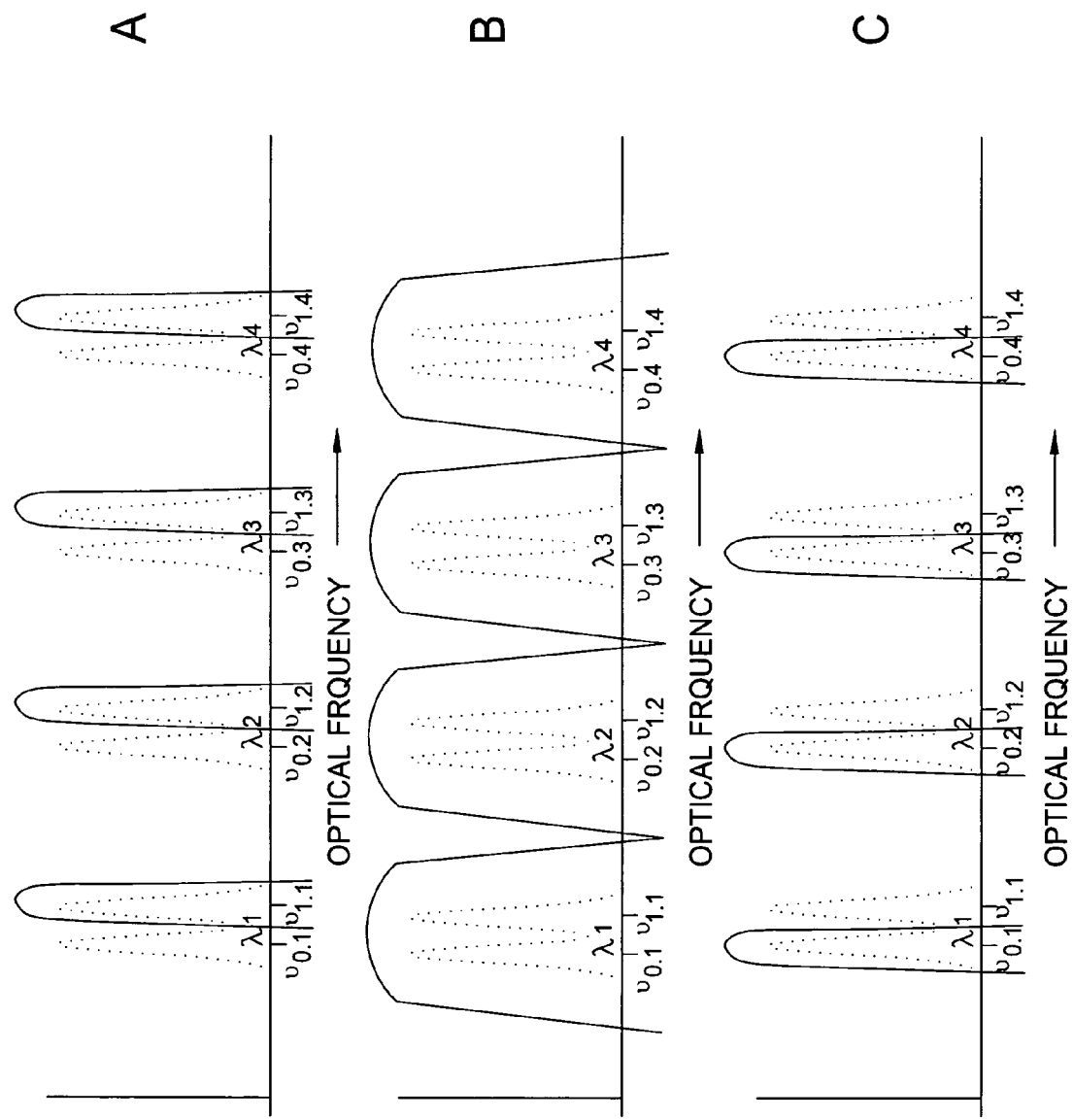
FIG. 11A graphically depicts the transfer function of the first AWG of the WDM FSK/IM receiver of FIG. 10.
FIG. 11B graphically depicts the transfer function of the second AWG of the WDM FSK/IM receiver of FIG. 10.
FIG. 11C graphically depicts the transfer function of the third AWG of the WDM FSK/IM receiver of FIG. 10.

FIGS. 11A, 11B, and 11C graphically depict the transfer functions of the three AWGs $1012_1$-$1012_3$ of the WDM FSK/IM receiver 1000 of FIG. 10, respectively. In FIG. 11A, the power of the FSK/IM signal is plotted as a function of the optical frequency of the FSK/IM signal for each of the four components (channels) of the first AWG $1012_1$. Similarly in FIGS. 11B and 11C, the power of the FSK/IM signal is plotted as a function of the optical frequency of the FSK/IM signal for each of the four components (channels) of the second AWG $1012_2$ and the third AWG $1012_3$, respectively. For illustrative purposes, the FSK/IM frequency spectrum is plotted as a dotted curve in FIGS. 11a-11c.

Although in FIG. 10, the concept of an embodiment of a WDM FSK/IM receiver in accordance with the present invention is illustrated using 1×4 AWGs, for the general case of an input optical signal having N channels, AWGs having an input and output configuration of 1×N will replace the 1×4 AWGs depicted in FIG. 10. In a WDM FSK/IM receiver of the present invention, such as the WDM FSK/IM receiver 1000 of FIG. 10, temperature-controlled $1 \times M_{1/3} \cdot N$ AWGs may be implemented for the first AWG $1012_1$ and the third AWG $1012_3$. Such AWGs have $M_{1/3} \cdot N$ outputs of which only each $M_{1/3}$th output is used. In such an embodiment of the present invention, the centre wavelengths of the FSK/IM channels are aligned to the ITU grid. By temperature detuning of the AWGs from their standard operation point, all FSK tones corresponding to respectively a logical high or a logical low are extracted at the AWG outputs. For the second AWG $1012_2$, a $1 \times M_2 \cdot N$ AWG is implemented of which only each $M_2^{th}$ output is used. However, since no detuning from the standard ITU operation point is required, a commercially available athermal (without temperature control) AWG may also be used for extracting the payloads.

Referring to the WDM FSK/IM receiver 1000 of FIG. 10, the inventors introduce the following parameters involved in deriving the metrics for the AWGs $1012_1$-$1012_3$ of such a configuration.

ChSp Channel spacing of the WDM FSK/IM signal
$\Delta\upsilon$ FSK tone spacing ($\Delta\upsilon$<ChSp/2)
$ChSp_i^{AWG}$ Channel spacing of AWGi (i∈[1,2,3])

$M_i$ Ratio between the FSK/IM channel spacing and the channel spacing of AWGi ($M_i \in N \setminus \{0\}$)
$BW_i^{1dB}$ 1 dB bandwidth of AWGi
$BW_i^{20dB}$ 20 dB bandwidth of AWGi
$\alpha_i$ Ratio between the 1dB bandwidth and the channel spacing of AWGi (0<$\alpha_i$<1)
$\beta_i$ Ratio between the 20 dB bandwidth and twice the channel spacing of AWGi (0<$\beta_i$<1)

In a WDM FSK/IM receiver in accordance with the present invention, such as the WDM FSK/IM receiver 1000 of FIG. 10, the requirements for the first AWG $1012_1$ and the third AWG $1012_3$ are equal which results in equation one (1), which follows:

$$M_1 = M_3, \alpha_1 = \alpha_3, \beta_1 = \beta_3. \quad (1)$$

To ensure at least a 20 dB suppression of the undesired FSK tone with respect to the desired one, the steepness of the first AWG $1012_1$ and the third AWG $1012_3$ transmission curves are determined by equation two (2), which follows:

$$\Delta\upsilon \geq \frac{BW_1^{20dB}}{2} = \beta_1 ChSp_1^{AWG} = \frac{\beta_1}{M_1} ChSp \Leftrightarrow M_1 \geq \beta_1 \frac{ChSp}{\Delta\upsilon}. \quad (2)$$

For the retrieval of the IM payloads it is essential that both FSK tones are captured within the 1 dB bandwidth of the second AWG $1012_2$. This leads to the requirement depicted in equation three (3), which follows:

$$\Delta\upsilon \leq BW_2^{1dB} = \alpha_2 ChSp_2^{AWG} = \frac{\alpha_2}{M_2} ChSp \Leftrightarrow M_2 \leq \alpha_2 \frac{ChSp}{\Delta\upsilon}. \quad (3)$$

At the same time, sufficient suppression of the FSK tones belonging to adjacent channels is needed. To arrive at about 20 dB suppression, the steepness of the second AWG $1012_2$ transmission curves is determined according to equation four (4), which follows:

$$ChSp - \frac{\Delta\upsilon}{2} \geq \frac{BW_2^{20dB}}{2} = \beta_2 ChSp_2^{AWG} \quad (4)$$

$$= \frac{\beta_2}{M_2} ChSp \Leftrightarrow M_2 \geq \frac{\beta_2 ChSp}{ChSp - \Delta\upsilon/2}.$$

Figure 12:
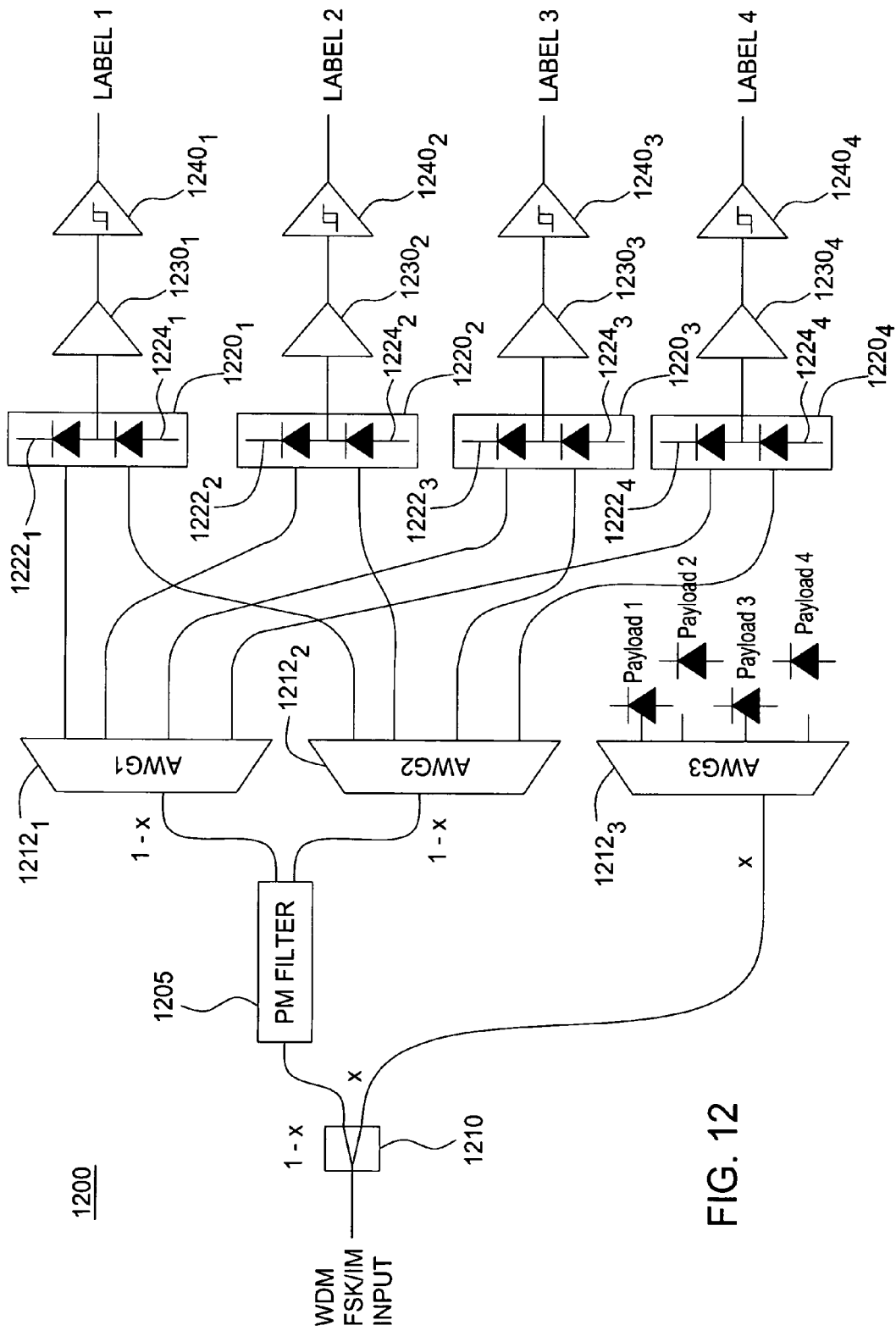
FIG. 12 depicts a high level block diagram of an alternate embodiment of a WDM FSK/IM receiver in accordance with the present invention.

FIG. 12 depicts a high level block diagram of an alternate embodiment of a WDM FSK/IM receiver in accordance with the present invention. The WDM FSK/IM receiver 1200 of FIG. 12 illustratively comprises a polarization maintaining (PM) filter 1205, an optical splitter 1210, three arrayed waveguide gratings (AWGs) $1212_1$-$1212_3$ (collectively AWGs 1212), four balanced detectors $1220_1$-$1220_4$ (collectively balanced detectors 1220), four amplifiers (illustratively TransImpedance Amplifiers (TIA)) $1230_1$-$1230_4$ (collectively TIAs 1230), and four Schmitt-triggers $1240_1$-$1240_4$ (collectively Schmitt-triggers 1240). The balanced detectors 1220 of the FSK/IM receiver 1200 of FIG. 12 each comprise two respective photodiodes $1222_1$-$1222_4$ and $1224_1$-$1224_4$. Each of the AWGs 1212 of the WDM FSK/IM receiver 1200 of FIG. 12 illustratively separates an incoming signal into four components (channels).

Illustratively, in FIG. 12, the first channel of the first AWG $1212_1$ and the second AWG $1212_2$ are communicated to the first balanced detector $1220_1$, the second channel of the first AWG $1212_1$ and the second AWG $1212_2$ are communicated to the second balanced detector $1220_2$, the third channel of the first AWG $1212_1$ and the second AWG $1212_2$ are communicated to the third balanced detector $1220_3$, and the fourth channel of the first AWG $1212_1$ and the second AWG $1212_2$ are communicated to the fourth balanced detector $1220_4$.

The configuration and function of the WDM FSK/IM receiver 1200 of FIG. 12 is substantially the same as described above with respect to the WDM FSK/IM receiver 1000 of FIG. 10 with the exception of the addition of the PM filter 1205. In the WDM FSK/IM receiver 1200 of FIG. 12, the FSK tone separation is performed on all channels simultaneously by the PM filter 1205 before demultiplexing the individual tones using the AWGs 1212.

An advantage of the configuration of the WDM FSK/IM receiver 1200 over the FSK/IM receiver 1000 of FIG. 10 is the use of relatively cheap athermal AWGs with less constraint regarding their specifications. For the first AWG $1212_1$, the second AWG $1212_2$ and the third AWG $1212_3$, the same type of demultiplexer, exhibiting transmission curves as shown in FIG. 11b may be implemented. The metrics for the AWGs 1212 in the WDM FSK/IM receiver 1200 of FIG. 12 may be characterized according to equations five (5), six (6), and seven (7), which follow:

$$M_1 = M_2 = M_3, \alpha_1 = \alpha_2 = \alpha_3, \beta_1 = \beta_2 = \beta_3, \quad (5)$$

$$\Delta\upsilon \le BW_2^{1dB} = \alpha_2 ChSp_2^{AWG} = \frac{\alpha_2}{M_2} ChSp \Leftrightarrow M_2 \le \alpha_2 \frac{ChSp}{\Delta\upsilon} \quad (6)$$

$$ChSp - \frac{\Delta\upsilon}{2} \ge \frac{BW_2^{20dB}}{2} = \beta_2 ChSp_2^{AWG} \quad (7)$$
$$= \frac{\beta_2}{M_2} ChSp \Leftrightarrow M_2 \ge \frac{\beta_2 ChSp}{ChSp - \Delta\upsilon/2}.$$

The use of the PM filter 1205 provides ideal FSK tone separation (full extinction of the undesired tone per branch) and a 3 dB sensitivity improvement regarding the label reception. However, it also introduces an additional constraint to the ratio between Channel spacing of the WDM FSK/IM signal, ChSp, and FSK tone spacing, $\Delta\upsilon$, which may be characterized according to equation eight (8), which follows:

$$\frac{ChSp}{\Delta\upsilon} = \frac{2n}{2m-1}, m \in N\setminus\{0\}, n \in [m, m+1, \ldots, \infty>. \quad (8)$$

Figure 13:
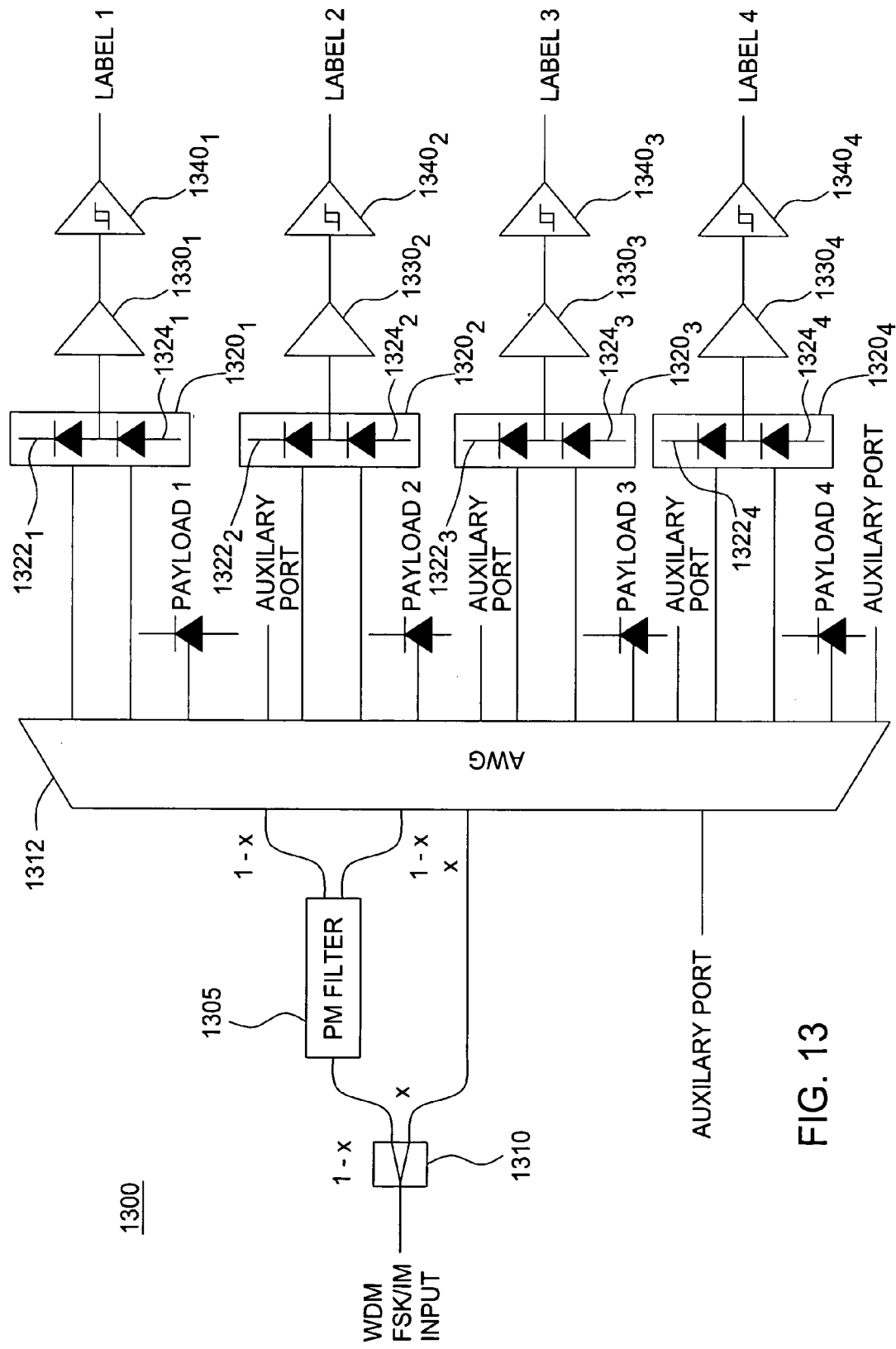
FIG. 13 depicts a high level block diagram of an alternate embodiment of the WDM FSK/IM receiver of FIG. 12.

Further integration of a WDM FSK/IM receiver in accordance with the present invention may be achieved by exploiting the recurrent behaviour of M×M•N AWGs (i.e., N WDM channels (ChSp=M•ChSp$^{AWG}$) are demultiplexed to output ports 1, M+1, ..., (N−1)•M+1 when using input port 1, to output ports 2, M+2, ..., (N−1)•M+2 when using input port 2, and to output ports M, 2•M, ..., N•M when using input M). For example, FIG. 13 depicts a high level block diagram of an alternate embodiment of the WDM FSK/IM receiver 1200 of FIG. 12. The WDM FSK/IM receiver 1300 of FIG. 13 comprises substantially the same components as the WDM FSK/IM receiver 1200 of FIG. 12 except that a single M×M•N AWG 1312 is implemented in place of the three AWGs 1212 depicted in the WDM FSK/IM receiver 1200 of FIG. 12.

More specifically, The WDM FSK/IM receiver 1300 of FIG. 13 illustratively comprises a polarization maintaining (PM) filter 1305, an optical splitter 1310, an arrayed waveguide grating (AWG) 1312, four balanced detectors $1320_1$-$1320_4$ (collectively balanced detectors 1320), four amplifiers (illustratively TransImpedance Amplifiers (TIA)) $1330_1$-$1330_4$ (collectively TIAs 1330), and four Schmitt-triggers $1340_1$-$1340_4$ (collectively Schmitt-triggers 1340). The balanced detectors 1320 of the FSK/IM receiver 1300 of FIG. 13 each comprise two respective photodiodes $1322_1$-$1322_4$ and $1324_1$-$1324_4$.

In the WDM FSK/IM receiver 1300 of FIG. 13, the minimum value allowed for the ratio M equals 3. The other metrics for this implementation are still characterized according to Equations (6), (7) and (8) depicted above with $M_2$ replaced by M. The number of auxiliary input ports in the WDM FSK/IM receiver 1300 of FIG. 13 equals M-3, corresponding to M-3 additional AWGs. These extra AWGs may be used as (de) multiplexers for other FSK/IM signals in accordance with the present invention.

In accordance with the present invention, each of the components of the FSK/IM receivers of the present invention may be integrated on a single chip using known integration techniques. The number of fiber pigtails may be reduced by hybrid chip integration of the balanced receivers with the all-optical parts in the same module.

As previously described, the present invention is capable of detecting optical signals that have an optical spectrum consisting of at least two tones, one for the high level and one for low level. In principle, embodiments of the present invention may detect a pure optical FSK signal (or other such signals, such as an SCM signal) even without being modulated onto ASK or IM signals. In addition, because the components implemented in the present invention are not polarization sensitive, the aspects of the present invention function independent of the polarization state of incoming signals, such as FSK/IM signals. Even further, the proposed devices do not use high-speed electronics and operate in the optical domain. Therefore no matter the repetition rate of the IM signal and the repetition rate of the incoming signals (e.g., FSK), the devices are capable of separating FSK (or SCM) from IM.

Due to the inherent large bandwidth of the components of the present invention, the present invention exhibits a tolerance to frequency deviation. For example, if the wavelength of the combined FSK/IM (or SCM/IM) signal is slightly shifted, the present invention will continue to operate, only at the cost of detecting a weaker (in terms of optical power) signal.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for receiving a frequency modulated signal on an intensity modulated optical carrier at a receiver, comprising:

separating frequency tones of said frequency modulated signal on said intensity modulated optical carrier; wherein the frequency tones comprise at least a first frequency tone corresponding to a logical high and a second frequency tone corresponding to a logical low;

combining said frequency tones to provide a resultant signal; and subjecting said resultant signal to a multiple threshold discrimination to extract thereby indicia of a logic level transition;

wherein said method is performed at said receiver.

2. The method of claim 1, wherein said combining comprises:

converting each of said frequency tones into a representative current and subtracting the currents to determine a resultant current; and converting said resultant current into a differential voltage.

3. The method of claim 2, wherein each of said frequency tones is converted to a representative current using electro-optic detecting.

4. The method of claim 2, wherein said resultant current is converted into a differential voltage using TransImpedance amplification.

5. The method of claim 2, wherein said subjecting comprises performing a logic operation on said resultant signal using two predetermined voltage thresholds, wherein said two predetermined voltage thresholds include a high threshold to switch during low-to-high transitions of said frequency modulated signal and a lower threshold to switch during high-to-low transitions of said frequency modulated signal.

6. The method of claim 5, wherein said logic operation comprises a hysteresis triggering scheme.

7. A receiver for receiving a frequency modulated signal on an intensity modulated optical carrier, comprising:

a means for separating frequency tones of said frequency modulated signal on an intensity modulated optical carrier; wherein the frequency tones comprise at least two frequency tones corresponding to a logical high and a logical low respectively;

a balanced detector including individual detectors for separately detecting each of said frequency tones;

an amplifier, for converting a current output of said balanced detector into a differential voltage output; and a logic circuit having two voltage thresholds, said voltage thresholds including a high threshold to switch the logic circuit during low-to-high transitions of said frequency modulated signal and a lower threshold to switch the logic circuit during high-to-low transitions of said frequency modulated signal, said logic circuit adapted for receiving the differential voltage output of said amplifier and providing an output indicative of said frequency modulated signal.

8. The receiver of claim 7, wherein said means for separating the frequency tones of said frequency modulated signal comprises a frequency discriminator.

9. The receiver of claim 7, wherein said means for separating the frequency tones of said frequency modulated signal comprises a coupler including a single input path and two output paths, wherein each of said output paths comprises a Fiber Bragg grating.

10. The receiver of claim 9, wherein a first Fiber Bragg grating in a first path of said two output paths is adapted to eliminate a frequency tone of the frequency modulated signal corresponding to a logical low and wherein a second Fiber Bragg grating in a second path of said two output paths is adapted to eliminate a frequency tone of the frequency modulated signal corresponding to a logical high.

11. The receiver of claim 7, wherein said means for separating the frequency tones of said frequency modulated signal comprises a circulator including a single input path and two output paths, wherein one of said two output paths comprises a Fiber Bragg grating.

12. The receiver of claim 11, wherein said Fiber Bragg grating is located in a first path of said two output paths and is adapted to transmit a first tone of the frequency modulated signal and to reflect a second tone of the frequency modulated signal, wherein the second tone of the frequency modulated signal is reflected by said circulator to a second of said two output paths.

13. The receiver of claim 12, wherein the Fiber Bragg grating transmits a frequency tone of said frequency modulated signal corresponding to a logical high and reflects a frequency tone of said frequency modulated signal corresponding to a logical low.

14. The receiver of claim 7, wherein said means for separating the frequency tones of said frequency modulated signal comprises a thin film filter including a single input path and two output paths.

15. The receiver of claim 14, wherein said thin film filter is adapted to transmit a first tone of the frequency modulated signal to a first of said two output paths and to reflect a second tone of the frequency modulated signal to a second of said two output paths.

16. The receiver of claim 15, wherein said thin film filter transmits a frequency tone of said frequency modulated signal corresponding to a logical high and reflects a frequency tone of said frequency modulated signal corresponding to a logical low.

17. The receiver of claim 7, wherein said amplifier comprises a TransImpedance Amplifier.

18. The receiver of claim 7, wherein said logic circuit comprises a Schmitt Trigger.

19. The receiver of claim 7, wherein said frequency modulated signal comprises a subcarrier modulated (SCM) signal and wherein the output of one of said individual detectors of said balanced detector is inverted.

20. A multi-channel receiver for receiving multiple frequency modulated signals on an intensity modulated multi-channel optical carrier, comprising:

an optical splitter for splitting a received intensity modulated multi-channel optical carrier into respectively received portions;

a multi-port demultiplexer adapted to demultiplex each of the respectively received portions into its component demultiplexed channels and to separate frequency tones of each demultiplexed channel; wherein the frequency tones comprise at least two frequency tones corresponding to a logical high and a logical low respectively;

a plurality of balanced detectors, each of said balanced detectors receiving a respective one of said demultiplexed channels, wherein each of said balanced detectors includes individual detectors for separately detecting separated frequency tones of respective demultiplexed channels;

a plurality of amplifiers, said amplifiers adapted to convert a current output of a respective one of said balanced detectors into a respective differential voltage output; and a plurality of logic circuits, each logic circuit having two voltage thresholds, said voltage thresholds including a high threshold to switch the logic circuit during low-to-high transitions and a lower threshold to switch the logic circuit during high-to-low transitions, said logic circuits adapted for receiving the respective differential voltage output of a respective one of said amplifiers and providing an output indicative of a frequency modulated signal of a respective one of said demultiplexed channels.

21. The multi-channel receiver of claim 20, further comprising a polarization maintaining filter for separating the frequency tones of the frequency modulated signals of the intensity modulated multi-channel optical carrier before the demultiplexing by said demultiplexer.

22. The multi-channel receiver of claim 20, wherein said multi-port demultiplexer comprises a multi-port arrayed waveguide grating (AWG).

23. A multi-channel receiver for receiving multiple frequency modulated signals on an intensity modulated multi-channel optical carrier, comprising:

an optical splitter for splitting a received intensity modulated multi-channel optical carrier into two portions;

a first demultiplexer adapted to demultiplex a respectively received portion of said intensity modulated multi-channel optical carrier into component demultiplexed channels but only transmit a first frequency tone of a respective frequency modulated signal of each of said demultiplexed channels;

a second demultiplexer adapted to demultiplex a respectively received portion of said intensity modulated multi-channel optical carrier into component demultiplexed channels but only transmit a second frequency tone of a respective frequency modulated signal of each of said demultiplexed channels;

a plurality of balanced detectors, each of said balanced detectors receiving respective one of said demultiplexed channels from said first and second demultiplexers, wherein each of said balanced detectors include individual detectors for separately detecting said first frequency tone and said second frequency tone for a respective one of said demultiplexed channels;

a plurality of amplifiers, said amplifiers adapted to convert a current output of a respective balanced detector into a respective differential voltage output; and a plurality of logic circuits, each of said logic circuits having two voltage thresholds, said voltage thresholds including a high threshold to switch the logic circuit during low-to-high transitions and a lower threshold to switch the logic circuit during high-to-low transitions, said logic circuits adapted for receiving the differential voltage output of a respective one of said plurality of amplifiers and providing an output indicative of a frequency modulated signal of a respective one of said demultiplexed channels.

24. The multi-channel receiver of claim 23, wherein said optical splitter is configured to split said received intensity modulated multi-channel optical carrier into three portions, and wherein said multi-channel receiver comprises a third demultiplexer, said third demultiplexer configured to receive a third portion of said received intensity modulated multi-channel optical carrier and to demultiplex said third portion of said received intensity modulated multi-channel optical carrier into component demultiplexed channels for obtaining intensity modulation information of each demultiplexed channel of said third portion of said intensity modulated multi-channel optical carrier.

25. The multi-channel receiver of claim 23, further comprising a polarization maintaining filter for separating the frequency tones of the frequency modulated signals of the intensity modulated multi-channel optical carrier before the demultiplexing by said first and second demultiplexers.

26. The multi-channel receiver of claim 23, wherein said first and second demultiplexers comprise arrayed waveguide gratings.

* * * * *

UNITED STATES PATENT AND TRADEMARK OFFICE
CERTIFICATE OF CORRECTION

PATENT NO. : 7,650,081 B2 Page 1 of 1
APPLICATION NO. : 10/853825
DATED : January 19, 2010
INVENTOR(S) : Jennen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1549 days.

Signed and Sealed this

Twenty-eighth Day of December, 2010

David J. Kappos
*Director of the United States Patent and Trademark Office*